United States Patent [19]
Gallery et al.

[11] Patent Number: 6,034,690
[45] Date of Patent: Mar. 7, 2000

[54] POST-PROCESSING GENERATION OF FOCUS/DEFOCUS EFFECTS FOR COMPUTER GRAPHICS IMAGES

[75] Inventors: Richard D. Gallery, Horlem; Nathan D. Bliss, East Grinstead, both of United Kingdom

[73] Assignee: U.S. Philips Corporation, New York, N.Y.

[21] Appl. No.: 08/905,906

[22] Filed: Aug. 4, 1997

[30] Foreign Application Priority Data

Aug. 2, 1996 [GB] United Kingdom ............... 9616262

[51] Int. Cl.⁷ ............................................. G06T 5/10
[52] U.S. Cl. .................... 345/419; 345/428; 345/432; 345/953; 348/415; 382/239
[58] Field of Search ............................. 348/415; 382/239; 345/419, 422, 428, 432, 953

[56] References Cited

U.S. PATENT DOCUMENTS

| | | | |
|---|---|---|---|
| 5,270,813 | 12/1993 | Puri et al. ............................. | 348/415 |
| 5,301,242 | 4/1994 | Gonzales et al. .................... | 382/239 |

FOREIGN PATENT DOCUMENTS

| | | | |
|---|---|---|---|
| 0610080 | 8/1994 | European Pat. Off. ........ | G06F 15/68 |
| WO 9614621 | 5/1996 | WIPO ............................. | G06T 15/00 |

OTHER PUBLICATIONS

"Synthetic Image Generation with a Lens and Aperture Camera Model" M. Potmesil and I. Chakravarty, ACM Transactions on Graphics vol. 1, No. 2, Apr. 1982, pp. 85–108.

"Two 2D Postprocessing Tools and their Applications to the Improvement of 3D Pictures" J.F. Colonna, The Visual Computer (1994), pp. 239–242.

"Computer Graphics: Principles and Practice" J.D. Foley, van Dam, Feiner and Hughes, 2nd Edition (1990), published by Addison–Wesley, ISBN 0–201–12110–7, at pp. 668–672.

*Primary Examiner*—Mark K. Zimmerman
*Assistant Examiner*—Kimbinh Nguyen
*Attorney, Agent, or Firm*—Gregory L. Thorne

[57] ABSTRACT

A method and apparatus are described for post-processing a computer-generated image of a three-dimensional object for display as a pixel image. A focus depth is specified either by a user or from within the system for each image frame. The image pixels are grouped into non-overlapping blocks of adjoining image pixels with a single respective depth value pre-specified or calculated at run-time for each block. Each block is extracted in turn from the image and the pixels within a block are convolution filtered with a common set of filter coefficients. Padding may be applied to fill areas where a full filter kernel cannot be formed. The technique has particular suitability for MPEG-coded image streams where the existing MPEG macroblock specification may be taken advantage of.

11 Claims, 3 Drawing Sheets

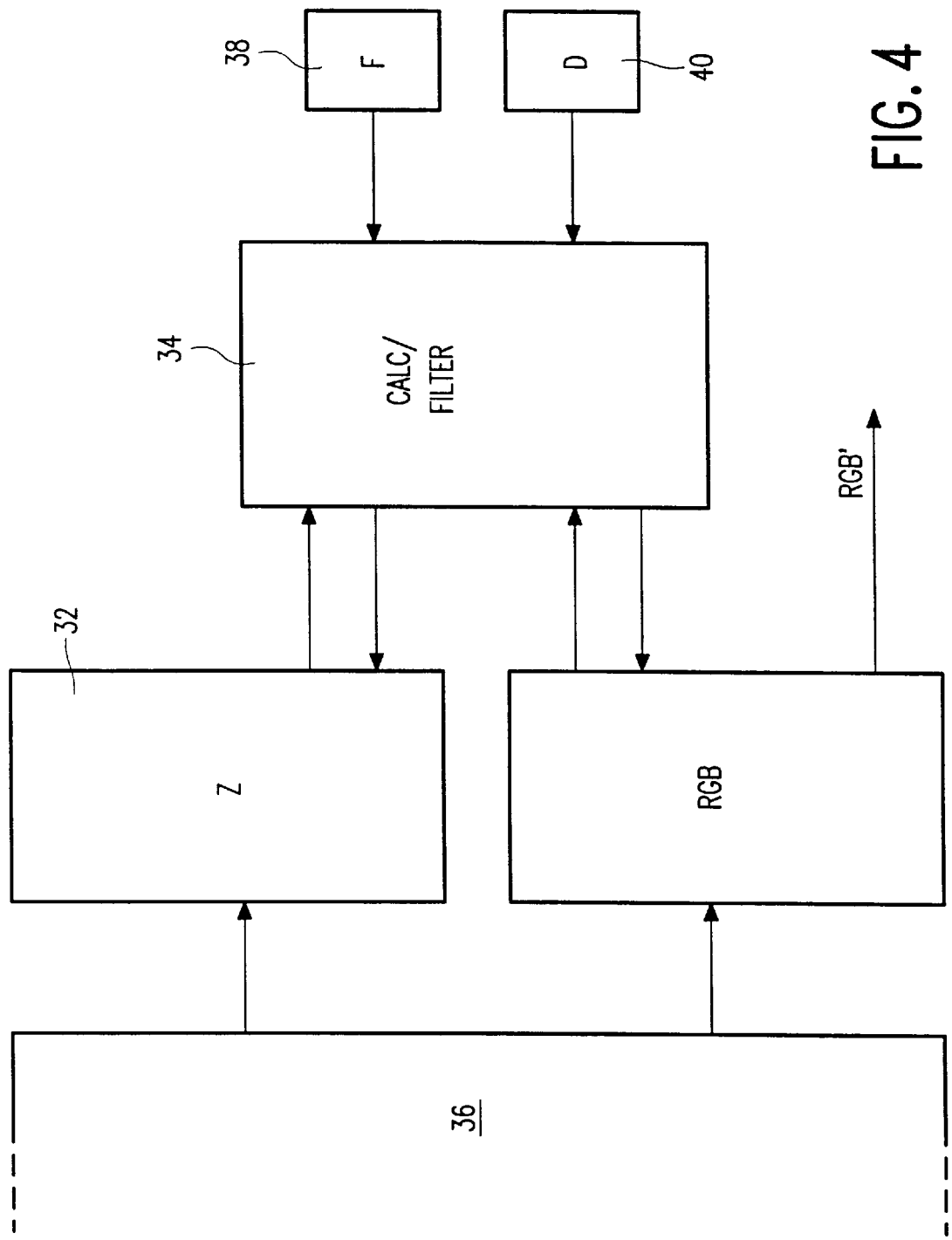

POST-PROCESSING GENERATION OF FOCUS/DEFOCUS EFFECTS FOR COMPUTER GRAPHICS IMAGES

BACKGROUND OF THE INVENTION

The present invention relates to a method and apparatus for modifying computer generated images and, in particular, for selective application of focusing/defocusing (i.e. selective blurring) effects to provide apparent depth cues in three-dimensional images for display in two dimensions.

Synthetically generated computer graphics images may suffer from the deficiency of being uniformly sharp, with all parts of the image appearing to be in focus, but simulating the effects of focus/de-focus is often highly expensive both in terms of computational power and memory bandwidth. One example of a technique for applying defocus effects is described in "Synthetic Image Generation with a Lens and Aperture Model" by M. Potmesil and I. Chakravarty, ACM Transactions on Graphics Vol.1, No.2, April 1982 at pp.85–108. The Potmesil technique is computationally expensive however and is impractical for real-time systems.

An alternative and slightly simpler technique is described in "Two 2D Postprocessing Tools and their Applications to Improvement of 3D Pictures" by J-F. Colonna, The Visual Computer (1994), at pp.239–242. Colonna describes a post-processing tool which uses a variable length convolution filter based around a generalised multiplication table to provide an impression of depth in an image by increasing variation in filter length at increasing distance along the z-axis (towards foreground or background) from a focus depth. Despite the relative simplicity arising from commonality of features in the filter arrangements of Colonna, the techniques are still slowed by the required process step of selecting the appropriate filter with reference to the depth value for each pixel.

A further problem encountered with systems such as that of Colonna occurs at sharply receding surfaces and depth discontinuities, which problems are addressed in our International patent application WO96/14621 where a method and apparatus are provided for post-processing computer-generated images of a three-dimensional object for display as a series of pixels, having a respective depth value for each pixel and a focus depth specified for each image frame. Each image pixel is filtered using contributions from other pixels of the image about the image pixel and with filter coefficients determined by the image pixel depth value and focus depth; the filter contributions are selectively inhibited by an amount determined, for each contributing pixel, by an inhibition function which suitably relates the contributing pixel depth value, the image pixel depth value, and the focus depth.

OBJECTS AND SUMMARY OF THE INVENTION

Whilst this technique is capable of good quality focus/defocus effects with less processor power than required by systems such as Potmesil and Colonna, there is a need for a still simpler technique capable of higher speed (real time) implementation.

It is accordingly an object of the present invention to provide a computationally inexpensive technique capable of real-time implementation.

It is an additional object to provide such a technique which is suitable for application to block-based encoded images (such as JPEG and MPEG).

In accordance with the present invention there is provided a method for post-processing a computer-generated image of a three-dimensional object for display as a series of pixels, having a focus depth specified for each image frame, wherein image pixels are filtered using contributions from other pixels of the image about the image pixel and with filter coefficients determined in part by the focus depth, characterised in that the image pixels are grouped into blocks of adjoining image pixels with a single respective depth value specified for each block, and all pixels of a block are filtered with the same filter coefficients, said filter coefficients being additionally determined by the block depth value.

We have found that, by working on a per-block basis, the technique may be applied in real-time since both the filter decisions and depth comparison are reduced by a factor of the block size, and although the defocus filtering for areas other than at the depth of interest may not be totally accurate, this is not a problem as the viewers attention is naturally directed away from such areas to concentrate on the features in focus. The technique may also be applied as a preliminary step, prior to a per-pixel calculation (such as in WO 96/14621). In effect, the technique is used to provide a quick initial "coarse" blurring.

The whole method may be applied in post-processing although we believe further benefit obtains if the image has been encoded as an MPEG stream and the blocks of adjoining image pixels are the MPEG macroblocks. This may be taken further if the respective depth value for each macroblock is precalculated and encoded in the MPEG stream.

Where a respective depth value is specified for each pixel of a block, the depth value for the block may be derived as a weighted average of the individual pixel depth values, or by majority vote among the individual pixel depth values, or by other techniques to be described hereinafter.

Substantially all of the image pixels of a block are preferably convolution filtered with a filter kernel having contributions from other pixels of the block close to the image pixel. Where the filtering action acts to decrease the overall size of the block, padding may be generated by various techniques to be described such as to generate filter kernel contributions for pixels of the block less than half the kernel width from the edge of the block: in this way, the filtered blocks may be held to the same size as the unfiltered.

The present invention further provides an image processing apparatus operable to effect the above-described post-processing method, the apparatus comprising a buffer memory arranged to receive and store a plurality of pixel values with associated depth values, a filter arranged to identify and extract from the buffer image block pixel values and depth values and operable to perform filtering on the basis of the block depth value and a predetermined focus depth value.

The apparatus may further comprise calculation means arranged to extract individually specified image pixel depth values for each pixel of a block from the buffer, and to derive a single block depth value from the individual pixel values. The filter may comprise a convolution filter with the buffer memory storing sufficient pixel values to cover the filter kernel, and the focus depth may be controllably variable, with the apparatus further comprising user-operable input means for supplying focus depth values to the convolution filter. dr

BRIEF DESCRIPTION OF THE DRAWINGS

Preferred embodiments of the present invention will now be described, by way of example only, and with reference to the accompanying drawings in which:

FIG. 4 shows an arrangement of buffer memories in relation to a calculation and convolution filtering stage embodying the present invention.

DESCRIPTION OF THE PREFERRED EMBODIMENTS

Figure 1A:
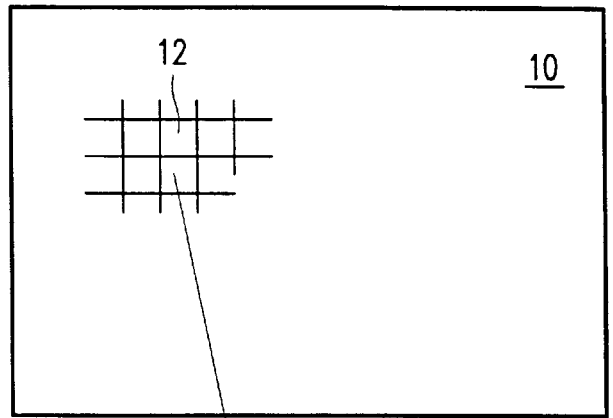
FIG. 1 schematically represents the extraction, processing and patching of image blocks in an implementation of the invention.
Figure 1B:
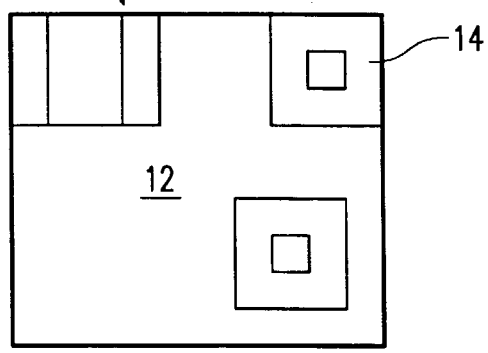
Figure 1C:
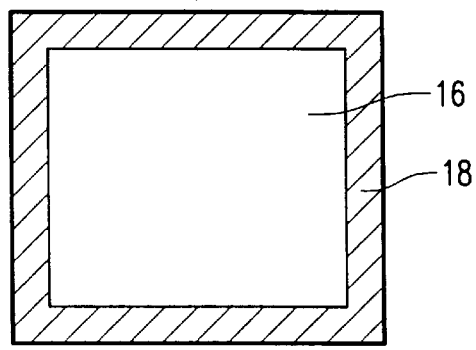
Figure 1D:
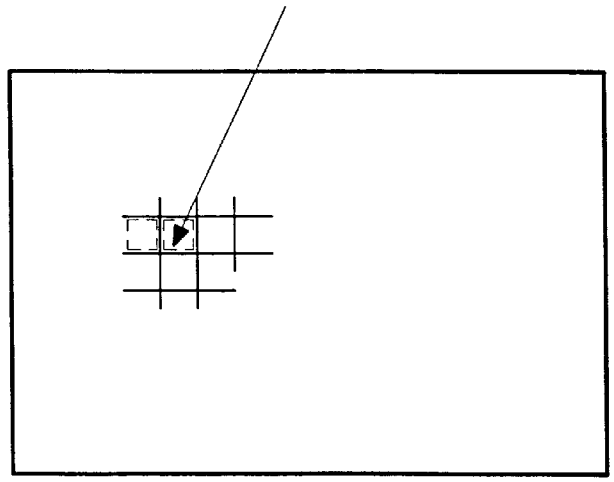

Beginning with FIG. 1, the following description assumes that an image 10 has been rendered with traditional Z-buffering techniques as described in, for example, "Computer Graphics: Principles and Practice" by Foley, van Dam, Feiner and Hughes, 2nd Edition (1990), published by Addison-Wesley, ISBN 0-201-12110-7, at pages 668–672. Such techniques will be familiar to the skilled practitioner and, for the purposes of illustrating the present invention, it will be sufficient to consider that we have a set of values RGB representing the colour of each individual pixel of the image 10, and that for each such pixel we also have a value $Z_p$ representing the depth value of that pixel.

As is schematically illustrated in FIG. 1 the process starts, as generally indicated at A, by dividing the image 10 into a series of blocks 12. A block size of the order of 10 pixels by 10 pixels square has been found to provide acceptable results although, as will be recognised, there is a trade-off to be made between the improved accuracy for smaller sized blocks and the increased processing required for such a block, as will be explained below. A particular benefit arises when the source of the image data is an MPEG1 image stream for which 16 pixel square blocks (referred to as macroblocks) are already specified, or an MPEG2 stream having 16×8 pixel macroblocks. Having the macroblocks pre-specified reduces the amount of work required to be performed by the post-processing system implementing the blurring. This work may be further reduced, thereby increasing the processing speed, if the MPEG stream further includes a per-block depth value, which depth value is derived by one of a number of possible techniques to be described below.

Each block 12 of the image is, in turn, extracted from the image for treatment, as indicated generally at B: note that at B (and also at C below) in the Figure, the extracted pixel block is shown enlarged for reasons of clarity only. Having been extracted, the pixels of the block are filtered by sub-grouping as filter kernels 14 with each kernel having its origin at the centre. For the 10×10 pixel block mentioned above, a 9 pixel (3×3) kernel has been found to produce acceptable results in terms of quality and speed. The particular form of the filtering will depend on the extent and type of blurring to be applied.

Figure 2:
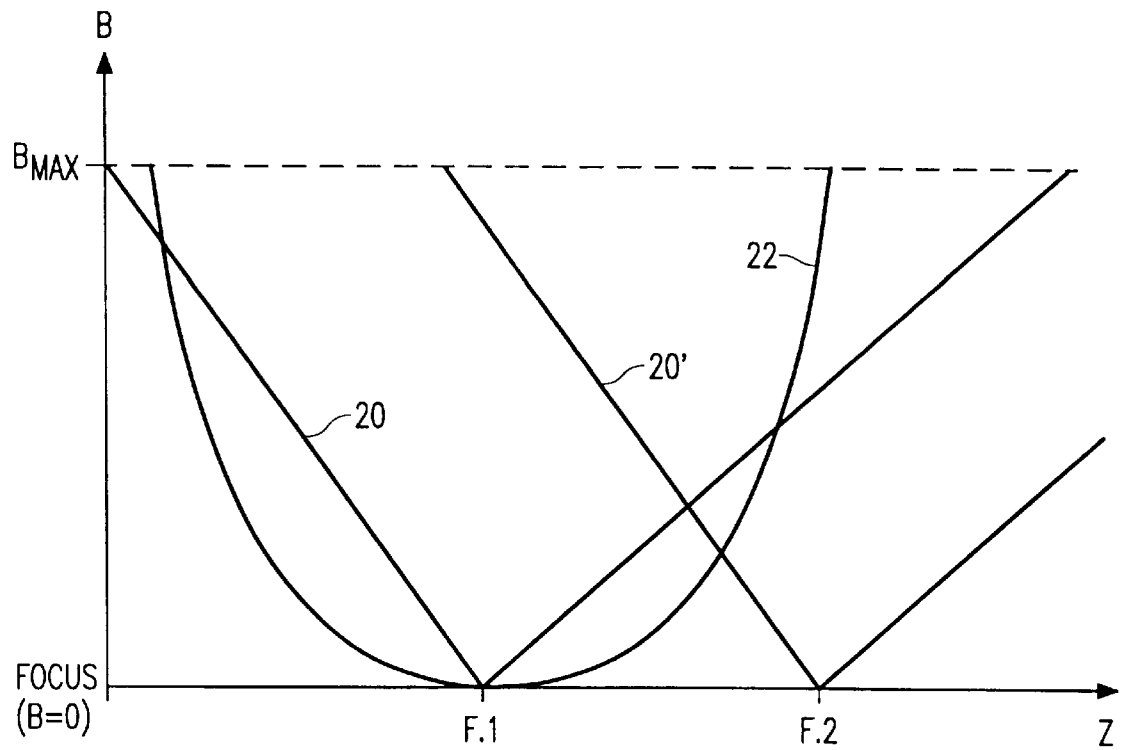
FIG. 2 is a first graph representing variation in the extent of applied blurring in relation to focus depth.

A suitable technique for giving the appearance of focus/de-focus applies a convolution filter preferably at each pixel in a block, although special techniques may be required for those pixels close to the edge of a block, as will be described: an explanation of the general technique of convolution filtering may be found in the above-mentioned textbook of Foley et al at pages 628–634. This filter is chosen, for each block, such that at pixels in blocks of the image with a depth close to a predetermined focus depth $Z_F$ for the image, the filter has little or no effect. As the depth of a block gets further away from the depth of the point of focus, the filter should blur the image more and more, as shown in FIG. 2. This corresponds to applying a variable length (in x and y) blurring filter across the image to the values RGB at each pixel, with the length of the filter adapting for each block on the basis of a comparison of an approximation to the depth value of the object of interest with the depth value of the point of focus.

The selection of the depth value per block $Z_B$ may be made in a number of ways, based on the respective depth values $Z_P$ of the pixels within that block. Where speed is at a premium, a simple technique is to take the greatest or least individual depth value, or a median of the two, as the block value. Where more time and/or processing capability is available, particularly where (as described above) the value is precalculated for inclusion in an MPEG stream, a more accurate value may be obtained by majority vote (the depth value common to the greatest number of pixels per block) or by averaging of the differing depth values of a block. This latter technique preferably includes weighting of the values averaged by the number of instances of that value or a figure derived therefrom. A further technique could be where a reduced scale image is generated (reduced by a factor of the block size), taking the per-pixel depth values of the reduced image and applying them to the corresponding blocks of a full size image.

Returning to FIG. 1, due to the nature of the filtering at step B, it is only directly applicable to those pixels which are within the block at a distance of half or more of the kernel size from the edge of the block, as indicated by the non-hatched area 16 at C. This is due to there being insufficient surrounding pixels to form a full kernel for those pixels at the edge of a block.

In order to avoid shrinkage or gaps appearing when the filtered block is patched back into the image, a padding treatment may be applied during filtering to fill the pixel area 18 (shown hatched at C) to return the block to its original size. A number of padding techniques are known for use with conventional filter kernels at page (screen) edges, for generating pixel values for use when a full filter kernel is not available and these techniques may be used to fill the areas 18. The techniques include repeating pixel edge values or "wrapping round" values from the opposite edge of the block in order to provide sufficient values of the right general order to construct a filter kernel centred on those pixels in the boundary area. Alternatively, the extraction step may pull overlapping blocks (e.g 12×12 to give a 10×10 filtered block) although padding will still be required for blocks at the image edge. Whatever technique is selected, it should one capable of rapid implementation since, as will be appreciated, the primary concern is speed/ease of implementation rather than image quality. This is particularly the case for the areas assigned the greatest extent of blurring as the principal purpose of applying the blurring is to direct the viewers attention away from these areas and toward the focused sections of the image.

The final stage of the process, as at D in FIG. 1, is to patch the filtered (and padded) block back into either the original image or, where necessary, into an appropriate location in a further store, and then pull the next block for filtering.

With the specification of a point of focus F (effectively a depth value $Z_F$ at the place in the image that the observer is intended to look at), in order to give the appearance of focus/de-focus it is assumed that for pixel blocks in the image with depth close to that of the point of focus the image should be sharp, but, as the depth of a pixel gets further away from the depth of the point of focus (whether nearer or closer to the position of the observer) then the image should become more blurred, as shown by FIG. 2 where the linear traces 20 and 20' follow the equation:

$$B = \frac{Z_F - Z_B}{Z_F} \cdot B_{MAX}$$

As will be recognised, a non-linear blurring profile, such as shown by trace 22, may be derived for application by the convolution filtering stage to give for example a wider "in-focus" depth range with more sharply increasing levels of blurring with greater distance.

Figure 3:
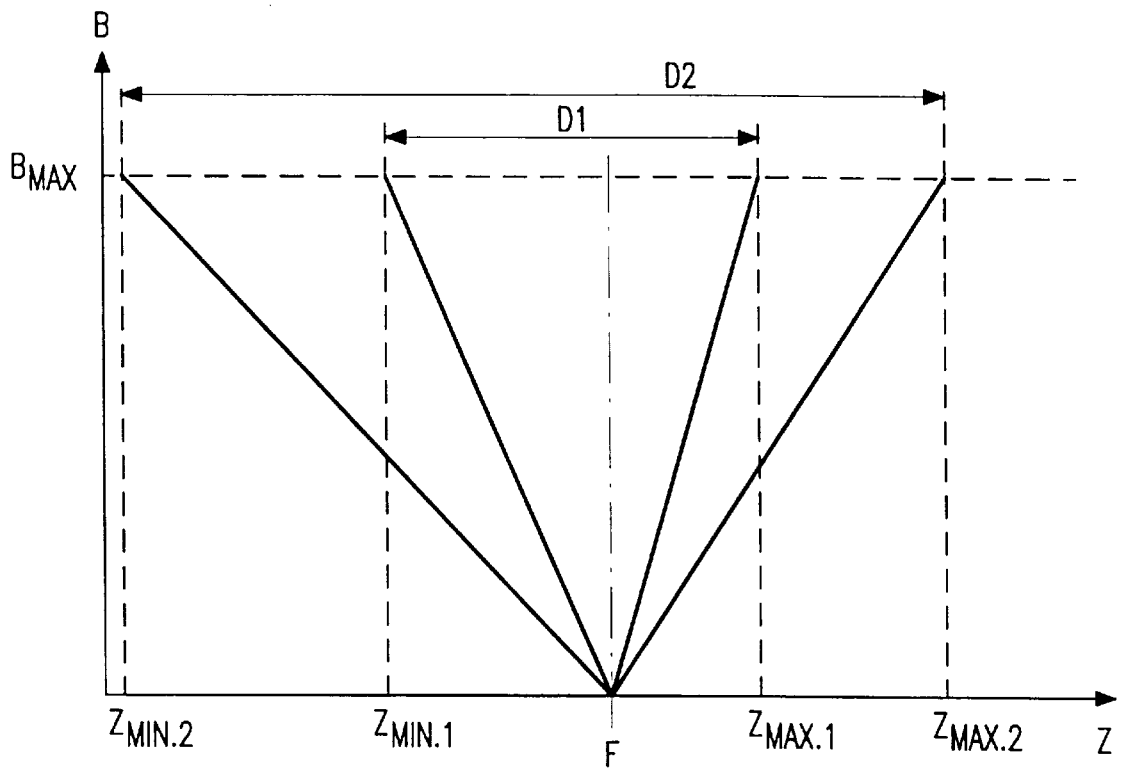
FIG. 3 is a second graph representing variation in the extent of applied blurring in relation to field depth.

The extent of blurring for any given deviation from the point of focus F may additionally be determined by a further value, the depth of field D, as shown in FIG. 3. The depth of field D is the difference between the maximum and minimum z-values supported and the increase in the extent of blurring is suitably made greater for small magnitudes of D. As shown in the Figure, for the specified maximum extent of blurring $B_{MAX}$, the blurring will increase more rapidly for a set shift in depth when the magnitude of D is smaller ($D_1 = Z_{max1} - Z_{min1}$) than for a larger depth of field ($D_2 = Z_{max2} - Z_{min2}$)

The processing required to implement the blurring algorithm is applied as a post-processing technique, that is to say to a complete generated picture. It could be performed, for example, as the image is read out of the display buffer to the screen, with the depth values for the pixels also being read, in synchronism, from the Z-buffer memory. Depending on the application, the Z-buffer memory may need to be double-buffered in the same way that a display buffer for such a system would be, so that Z values remain available for the displayed frame, while the next frame is being generated.

An alternative arrangement would be to use a "screen-space" type mechanism where the final image is rendered one line (or line of blocks) at a time. This would reduce the initial image buffering requirement (and consequently the Z buffering requirement) to 12 pixel lines or less for a 10×10 block based screen with a 3×3 kernel.

FIG. 4 shows an arrangement of a double frame buffer 30, a double Z-buffer 32 and a calculation and convolution filtering stage 34, with the buffers receiving respective outputs from an image source 36 and a stream of modified output pixel values RGB' being read out of the frame buffer 30 to a display (not shown). The frame buffer and Z-buffer have substantially identical capacities: for a 384×256 pixel screen, with 3 bytes per pixel (for RGB), approximately 60k bytes are required to store two full frames. The corresponding 3 bytes (24 bits) allocated per Z-value is sufficient to allow for relatively fine depth resolution. A further input 38 may be provided to the calculation and convolution filtering stage 34 for the point of focus F (or focus depth $Z_F$) with a further optional input 40 for the field depth D as described above. The value of $Z_F$ and/or D may be determined by the system or one or both may be input by a user in which case inputs 38 and 40 would be connected to receive signals from a suitable user input device such as a keyboard.

As will be appreciated from the foregoing, the present invention provides a relatively simple and computationally inexpensive (capable of realisation in hardware) technique for providing focus/defocus effects to computer generated graphics. As a post-processing technique, modification of the graphics generator is avoided although the present invention could of course be incorporated into such a generator as an output stage.

From reading the present disclosure, other modifications will be apparent to persons skilled in the art. Such modifications may involve other features which already known in the field of graphics manipulating and processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method for post-processing a computer-generated image of a three-dimensional object for display as a series of pixels, having a focus depth specified for each image frame, wherein:

image pixels are filtered using contributions from other pixels of the image about the image pixel and with filter coefficients determined in part by the focus depth;

the image pixels are grouped into a plurality of blocks of adjoining image pixels with a single respective depth value specified for each block; and all pixels of a block are filtered with the same filter coefficients, said filter coefficients being additionally determined by the block depth value.

2. A method as claimed in claim 1, wherein the image has been encoded as an MPEG stream and the blocks of adjoining image pixels are the MPEG macroblocks.

3. A method as claimed in claim 2, wherein the respective depth value for each macroblock is precalculated and encoded in the MPEG stream.

4. A method as claimed in claim 1, wherein a respective depth value is specified for each pixel of a block, and the depth value for the block is derived as a weighted average of the individual pixel depth values.

5. A method as claimed in claim 1, wherein a respective depth value is specified for each pixel of a block, and the depth value for the block is derived by majority vote among the individual pixel depth values.

6. A method as claimed in claim 1, wherein substantially all image pixels of a block are convolution filtered with a filter kernel having contributions from other pixels of the block close to the image pixel.

7. A method as claimed in claim 6, comprising the further step of padding to generate filter kernel contributions for pixels of the block less than half the kernel width from the edge of the block.

8. Image processing apparatus operable to effect the method of claim 1, the apparatus comprising a buffer memory arranged to receive and store a plurality of pixel values with associated depth values, a filter arranged to identify and extract from the buffer image block pixel values and depth values and operable to perform filtering on the basis of the block depth value and a predetermined focus depth value.

9. Apparatus as claimed in claim 8, further comprising calculation means arranged to extract individually specified image pixel depth values for each pixel of a block from the buffer, and to derive a single block depth value from the individual pixel values.

10. Apparatus as claimed in claim 8, wherein the filter is a convolution filter and the buffer memory stores sufficient pixel values to cover the filter kernel.

11. Apparatus as claimed in claim 8, wherein the focus depth is controllably variable, and further comprising user-operable input means for supplying focus depth values to the convolution filter.

* * * * *